May 13, 1958 J. A. H. GIFFARD 2,834,831

DATA RECORDING MEANS

Filed Dec. 19, 1950 2 Sheets-Sheet 1

INVENTOR:
J. A. H. GIFFARD
ATTORNEYS:
Moore and Hall

May 13, 1958

J. A. H. GIFFARD 2,834,831

DATA RECORDING MEANS

Filed Dec. 19, 1950

2 Sheets-Sheet 2

INVENTOR:
J. A. H. GIFFARD
ATTORNEYS:
Moore and Hall

United States Patent Office 2,834,831

Patented May 13, 1958

2,834,831

DATA RECORDING MEANS

John Anthony Hardinge Giffard, London, England, assignor, by mesne assignments, to International Business Machines Corporation, New York, N. Y., a corporation of New York Application December 19, 1950, Serial No. 201,810

Claims priority, application Great Britain December 22, 1949

3 Claims. (Cl. 178—15)

This invention relates to means for recording data and is more particularly concerned with an arrangement by which data in the form of an electrical signal, for instance, a pulse train comprising a series of sequential pulses whose position in the series is indicative of the data concerned, may be converted into a visible or photographical record. A particular, although by no means exclusive, application of the invention is to the recording of the output data from an electronic or electrical digital computing machine.

According to the invention the means for recording data comprises a first cathode ray tube having a screen bearing a number of areas in the form of symbols suitable for expressing the data which is to be recorded and which have a secondary electron emission ratio different from that of the rest of said screen, a signal plate associated with said screen, means for causing an electron beam to scan part of said screen bearing one of said areas, the part scanned being chosen in accordance with a signal representing the data to be recorded, a second cathode ray tube, means for scanning part of the screen in said second tube in synchronism with the scanning in the first tube, the parts of the screen which are successively scanned in said second tube being arranged in an orderly sequence and means for modulating the electron beam in said second tube in accordance with the signals derived from the signal plate of said first tube so that the symbols scanned in said first tube and selected in accordance with the data signals are reproduced in an orderly arrangement on the screen of said second tube.

According to one particular feature of the invention the said second tube is associated with a third cathode ray tube. The second tube is fitted with a signal plate over its screen and arranged in the manner of a Williams' type storage device whereby the data written on the screen of the second tube may be regenerated and maintained as a persistent display over a protracted period of time. The Williams' type storage tube is described in a paper entitled "A Storage System for Use With Binary-Digital Computing Machines," paper No. 763, dated November 2, 1948, Measurements Sections, The Institution of Electrical Engineers, pages 81–100.

According to another feature of the invention one or more further cathode ray tubes may be provided and operated in parallel with said second tube to provide for photographic recording and/or visual monitoring purposes.

In order that the various features of the invention may be more readily understood an embodiment thereof will now be described with reference to the accompanying drawings wherein.

Figure 1:
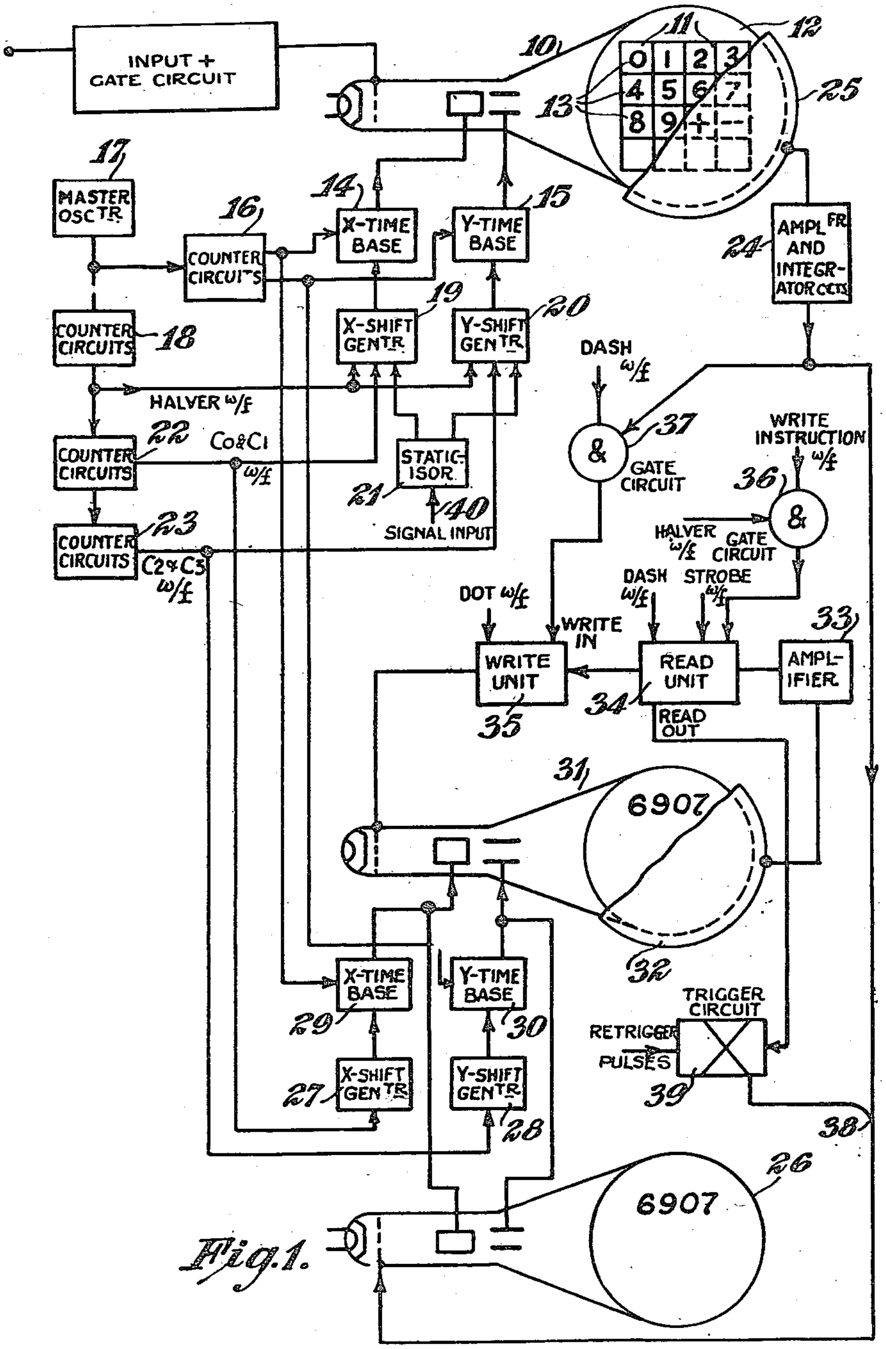
Fig. 1 is a block schematic diagram showing the various parts.

Referring to Fig. 1 of the drawings the embodiment shown comprises broadly a first cathode ray tube 10 having its end wall serving as a screen 12 subdivided into a plurality of discrete areas 11 each of which contains a symbol 13, the various symbols being of suitably different form, such as the decimal numbers 1 to 9 and the (+) and (−) signs as shown, suitable for expressing the data information which is required to be recorded either in permanent form or as a transitory visual display. The areas defining the symbols 13 are arranged to have a secondary emission ratio different from that of the secondary emission ratio of the remaining portions of the areas 11 of the screen 12 within which they are contained.

Means, comprising X- and Y-time base units 14 and 15 serve to provide a raster-form scanning movement of the electron beam of the tube 10 such as will just cover any one of the rectangular areas 11 while X- and Y-bias potentials derived from X-shift and Y-shift generator units 19 and 20 allow the controlled selection of any one of the areas 11 for performance of the aforesaid raster scanning action. The control of these units 19 and 20 is effected by the signal which is to be recorded, applied over input signal lead 40 to a staticisor 21 which provides, in known manner, variable control potentials suitable for application to each of the units 19 and 20 to adjust the latter so as to select the appropriate area 11 in accordance with the particular symbol-representing form of the input signal.

In a manner which will be described in greater detail later, the scanning action of the beam of tube 10 over the selected area 11 will provide output signal potentials upon a signal plate 25 which are applied through an amplifying integrating unit 24 to the beam intensity control electrode of a second cathode ray tube 26.

The beam of this second tube 26 is caused to perform a raster-like scanning movement similar to that of the tube 10, i. e. over a rectangular area resembling one of the areas 11, by means X- and Y-time base units 29 and 30 which are conveniently operated in the required synchronism with units 14 and 15 by being controlled from the same primary sources referred to later. The disposition of such raster-scanned area upon the screen of the tube 26, however, instead of being in accordance with the irregularly changing nature of the symbols of the input signal as in the tube 10, is arranged to be successively in each of a series of positions of ordered sequence, for example, in each of the positions of the first horizontal line followed by each position of the second horizontal line and so on. The requisite bias potentials for this purpose are provided by X- and Y-shift generator units 27 and 29 which are controlled, again in a manner described in greater detail later, in appropriately timed relationship with the primary sources controlling the raster-like scanning movement.

In the operation of the arrangement so far described, the symbols to be recorded are selected in turn from those on the screen 12 by the action of the input signal and are each scanned by the beam of the tube 10. The related signal output from such tube simultaneously controls the intensity of the beam of the tube 26 while the latter is sweeping over a series of similar raster covered areas which are successively displaced from one another in the required orderly manner of the chosen pattern for the eventual display or record, for example, in a series of horizontal lines as shown.

The display upon the screen of the tube 26 with such an arrangement will clearly be only transitory and although such transitory display may be adequate for some purposes, e. g. for photographic recording or for visual recording utilising screen material having considerable persistence for the tube 26, it may be desirable for many purposes to maintain the display for a prolonged period. This may be effected by providing a third cathode ray tube 31 forming part of a Williams' type storage device which includes the associated signal plate 32, amplifier 33, read unit 34 and write unit 35 to provide the known regeneration facility. The X- and Y-deflection potentials for the beam of this tube 31 are provided by the same units as the tube 26 whereby the two tube beams perform similar movements in synchronism. The signal from the amplifying/integrating unit 24 is applied as a write input to the storage device of tube 31 and the read output from the storage device is used to control the trigger circuit which feeds an output potential forming an additional control for the intensity of the beam of the tube 26.

In a manner analogous to that of the usual and known operation of a Williams' type storage device, any display pattern written on to the screen of the tube 31 may be continuously regenerated until deliberately erased therefrom and in consequence suitable signals for controlling the beam intensity of the tube 26 to repeat the display are repeatedly supplied to the latter tube to provide a maintained visible record.

The arrangement shown will now be described in greater detail. Sixteen separate areas 11 are shown in the figure, carrying by way of example in an array of four rows and four columns, the numerals 0 to 9, the arithmetical symbols (+) and (—) and four additional spare positions. Preferably the areas forming the symbols 13 have a secondary emission ratio, under the operating conditions of the tube, which is less than unity whereas the remaining portions of the screen areas 11 have a secondary emission ratio which is greater than unity. If the whole of the screen 12 or any one of the sections 11 of such screen is scanned by a uniform raster, a stable charge condition will be built up upon the screen in which the screen, ignoring the areas forming the symbols 13, acquires a positive charge. This charge is the resultant of the positive moving trail of charge created by the moving electron beam and the train of secondary electrons released from the screen under the point of impact of the primary beam in the manner already described by Williams in Proceedings of the Institution of Electrical Engineers, Part III, March 1949 and in the specifications of copending patent applications Ser. No. 790,879, filed December 10, 1947, by Frederic C. Williams, Ser. No. 50,136, filed September 20, 1948, by Frederic C. Williams and Tom Kilburn, and Ser. No. 124,192, filed October 28, 1949, by Frederic C. Williams and Tom Kilburn (hereinafter referred to as specifications A, B and C).

Figure 2:
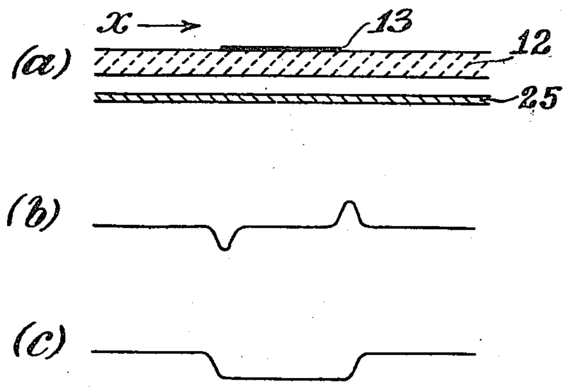
Fig. 2 shows at (*a*) a fragmentary sectional view showing the screen and signal plate formation of the first cathode ray tube and at (*b*) and (*c*) two associated voltage waveforms.

If the symbols 13 are in the form of plain areas of glass screen or of areas of carbon deposit, for example, as shown in the fragmentary view of Fig. 2(*a*), which have a secondary emission ratio less than unity, the electron beam of the tube when crossing such areas 13 will not produce a moving trail of positive charge and the areas will charge negatively. As a result of this, the refilling behind the moving trail of charge by secondary electrons will cease at each instant the moving beam moves on to a symbol and in consequence a well of positive charge will be left behind the moving beam. Thus when a stable state has been reached, a negative anticipation pulse will be obtained in a manner analogous to that within the known Williams' storage tube from a signal plate, such as that shown at 25, which is associated with the screen 12 of the tube 10, at an instant just prior to the crossing of a symbol by the moving electron beam and a positive pulse will be obtained as the moving beam leaves the symbol area and reproduces the moving positive charge trail. The voltage waveform obtained from the signal plate 15 of Fig. 2(*a*) when the primary beam is moving in the direction of the arrow *x* is indicated in Fig. 2(*b*). From this waveform can be derived a unidirectional pulse, as shown in Fig. 2(*c*), in a manner analogous to that used in the aforesaid Williams' arrangements. Thus it will be seen that if a symbol such as one of the areas 13 is covered by a raster-like scan identifiable signals will be obtained during each line period of such scan which determine the positions on each of such lines of the front and back edges of the symbol area.

Two possible methods of scanning the tube screen 12 when a number of separate symbols are disposed on such screen may be considered. In a first method the whole of the tube screen area 12 may be scanned by one large raster as is conventional in cathode ray tubes or television tubes and the individual areas 11 allocated to separate symbols may be selected on a time division basis which is accomplished in the usual manner by application of a suitable control voltage to the grid of the tube. Alternatively, in the second method which is used in the embodiment shown, a subsidiary small raster may be used just to cover the area 11 allocated to any one symbol 13 and such small raster may be successively displaced so that all of the symbol areas are scanned in succession. With this second method, a "scan-action" sequence must be introduced into the scanning process in order to ensure that stable charge conditions are obtained over the whole screen. Thus sequential scanning of all the symbol areas 11 (representing the numerals 0, 1, 2 . . . ) must be interspersed with the scanning of selected symbol areas 11 for the purpose of reading and display in a manner resembling the usual mode of operation of a Williams' storage device.

For the purposes of the subsequent description and explanation it will be convenient to assume some fixed relationships between the sizes of the raster or rasters used in the tube 10 and the size of the raster which is commonly employed in conventional digital electrostatic storage with tubes of the Williams' type. In one form of a Williams' tube arrangement, the raster employed usually provides for the storage of 32 separate lines each line being capable of holding or storing the signals representing 40 binary digits. For the purposes of the present description therefore it will be convenient to allocate to each symbol 13 a rectangular area of screen 11 which is equivalent to a rectangle of 10 x 8 digits in a Williams' type storage tube capable of holding a total of thirty-two 40-digit lines, i. e. a total of four symbols included in any one line of the Williams' tube scan and eight lines of such scan in each symbol.

With such preferred method of scanning illustrated in the arrangement of Fig. 1, a subsidiary or minor raster is generated to cover an area of the screen 12 which is ten digits long in the line scan direction and which comprises eight lines in the vertical or Y-direction. The appropriate waveforms for generating such a subsidiary raster are produced in conventional manner by the linear X-time base generator unit 14 and a stepped Y-time base generator unit 15 both appropriately controlled by waveforms derived from counter circuits 16 which are themselves synchronised or controlled from a master oscillator 17 which is operating at the chosen digit-repetition frequency of the signals used in the device and in the associated computing machine. A waveform, hereinafter referred to as the Halver wave, is derived by counting down the master oscillator 17 by the counter circuits 18 which may be of any convenient form to provide such Halver waveform as a square wave having a period time equal to 160 digits, that is having equal positive and negative half-periods each representing 80 digit intervals or one minor raster. The circuits of units 19 and 20 are each similar to the Y-shift generator described in the specification of copending patent application Ser. No. 93,612, filed May 16, 1949, by Frederic C. Williams and Tom Kilburn, now Patent No. 2,777,971, issued January 15, 1957 (hereinafter referred to as specification D). These X- and Y-shift generator circuits 19 and 20 are controlled by the Halver waveform so that during alternate 80-digit intervals they are controlled by the outputs from the staticisor 21 whereas during the intervening 80-digit intervals they are controlled by appropriate counter waveforms to produce a sequential scanning of all of the 16 minor raster or symbol areas 13. It will be apparent from the aforesaid specification D that the X-shift generator circuit 19 is controlled, in addition to the Halver waveform, by the so-called Counter 0 and Counter 1 waveforms produced by counting down from the Halver wave while the Y-shift generator circuit 20 will be similarly controlled by the Halver waveform and the so-called Counter 2 and Counter 3 waves also derived from the Halver waveform. The Counter 0 and Counter 1 waves are the respective outputs from tandem connected scale-of-two counter circuits 22, the first of which is supplied with the Halver waveform. Similarly, the Counter 2 and Counter 3 waveforms are the respective outputs from the similar Counter Circuits 23 the first of which is fed with the aforementioned Counter 1 waveform.

Consideration will now be given to the form of signal appearing in the output from the amplifier/integrating unit 24 which is connected to the signal plate 25 of the cathode ray tube 10. It will be found that, if during a particular line period the beam of the tube 10 crosses an area of symbol, e. g. when scanning the symbol 1, an output waveform as shown in Fig. 2(*b*) will be produced comprising a negative anticipation pulse and a positive pulse corresponding to the trailing edge of the symbol area and formed by the recreation of the moving trail of positive charge. If such output signal channel is given an integrating characteristic, for example, by providing the input of the amplifier 24 with an integrating circuit, the resultant output signal will comprise an approximately rectangular pulse as shown in Fig. 2(*c*) defining the duration in time of the passage of the electron beam across the symbol 13. Fig. 2(*b*) ignores signals produced at the beginning and end of each line scan period but obviously these may be eliminated by the application of a suitable sensitising and de-sensitising wave to the amplifier channel from the X-time base unit 14. In any case if such signals are not eliminated they will merely produce a change in the D. C. level of the signal shown in Fig. 2(*c*). When this output wave from the amplifying unit 14 is fed directly or after suitable further amplification and shaping, as a brilliance modulation control to the display cathode ray tube 16 which has fed to its X- and Y-deflecting plates raster waveforms similar to those used to cause exploration of each symbol area 11 of the screen of the cathode ray tube 10, such symbol will be displayed upon the screen of the cathode ray tube 16.

In order that the numbers and symbols which are selected may be arranged in the desired orderly fashion upon the display area of the tube 26, the X- and Y-deflections of the tube beam are not controlled by the same X- and Y-shift circuits utilised for the first cathode ray tube 10 but are provided with deflection potentials from X- and Y-time bases 29 and 30 which are controlled respectively by additional X- and Y-shift generator circuits 27 and 28 which may be similar in form to those of the shift generator circuits 19 and 20 for the tube 10 but which are continuously controlled only by the various Counter waveforms so that numbers read from the first cathode ray tube 10 will be arranged in ordered succession on the display tube 26.

In the arrangement as shown in Fig. 1 the shift circuits 27 and 28 differ slightly from the shift circuits 19 and 20 in that the staticisor controlled sections are omitted or rendered ineffective by the absence of a Halver controlled wave so that each minor raster will be repeated twice in succession, once during a so-called "Action" raster period of the tube 10 and once during the succeeding "Scan" raster period of the tube 10. It will be obvious that the invention is not restricted to the particular timing and spacing arrangements just described and the shift circuits associated with the display tube 26 could be organised to provide any required pattern of orderly display of the symbols 13 read from the tube 1.

For the purpose of providing for the display over an extended period of time if so desired a third Williams' type storage tube 31 may be employed. This tube has fed to its X- and Y-deflection systems the same waveforms from the X- and Y-time base units 29 and 30 as are fed to the display tube 26. This tube 31, however, is provided with a signal plate 32 and a regenerative loop comprising amplifier 33 and the associated gate circuits of reading unit 34 and writing unit 35 which may conveniently operate in the dot-dash mode as described in said specification B. Suitable Dot, Dash and Strobe waveforms derived from the master oscillator 7 are fed to the appropriate input terminals in a manner similar to that described in said specification B. In the absence of any output from the first cathode ray tube 10 and in the absence of any data stored upon the third cathode ray tube 31, Dots will be written into each digit posiiton in eahc raster area on this tube by the normal functioning of the Dot-Dash regenerative loop. When reading of the first tube is occurring an Erase waveform, conveniently the Halver waveform fed via a gate circuit 36 which is controlled by a Write Instruction signal derived from the associated computing machine, is applied to interrupt the regenerative loop of the cathode ray tube 31 and the output signal from the first cathode ray tube 10 is applied to open a gate circuit 37 which is in the path of the Dash waveform and thus permits such Dash waveform to be fed to the writing input connection of the regenerative loop. Thus the symbol which is scanned upon cathode ray tube 10 will be reproduced as a pattern of dashes on the third cathode ray tube 31 and will be regenerated thereafter so long as the erase terminal is not stimulated. A suitable over-riding control of the Halver erase waveform is provided as indicated by the aforesaid Write Instruction signal from the associated computing machine.

It will be apparent that during regeneration of a stored symbol pattern, Dash output pulses will be available from the read output connection from the reading unit 34 which can be used to produce the recorded symbol upon the display cathode ray tube 26 by feeding them through a buffer circuit 38 to the brilliance control electrode of the tube 26. If these Dash output pulses are applied directly as brilliance modulation to the display tube 26 the picture obtained will be coarser than that obtained by direct application to the display tube 26 of the output signals from the first cathode ray tube 10. It is thus an advantage to provide a pulse lengthening system which ensures that any group of Dash pulses in a line period is displayed upon the display cathode ray tube 16, not as a row of discrete dashes but as an uninterrupted length of trace. This pulse lengthening may conveniently be provided by inserting into the connection from the read output of the read unit 34 to the buffer circuit 38, a trigger circuit 39 which is set by the front edge of a Dash pulse into a condition such as will cause brightening up of the display tube 26, retrigger pulses each timed to occur within the duration of a Dash pulse being simultaneously applied to such trigger circuit 39. Thus the trigger circuit when set by the first Dash pulse of a train remains set into the condition corresponding to brightening up of the display tube 26 until it is reset by the first retriggered pulse to occur subsequent to the last Dash pulse in the train. It will be obvious that amplifying and polarity reversing circuits not shown may be included in the brilliance control connection to the tube 26 if required.

If operation of the tube 10 according to the first mentioned method using symbol selection on a time division basis is required it is necessary to control or gate the output signals from the amplifier/integrator unit 24 associated with the signal plate 25 of the cathode ray tube 10 by suitable waveforms which may be derived in conventional fashion. For example, a counter circuit controlled by a standard waveform at the digit repetition frequency could be used to provide four fundamental waveforms each comprising square pulses of duration equal to 10 digit periods, timed to embrace respectively the first, second, third and fourth of the ten digit groups in each scanning line. The feeding of these pulses to the gate circuit in the signal channel could be controlled by additional gate circuits which were themselves controlled by staticised instruction digits, of the input signal or instruction word; thus digits 0, 0 in some particular positions in a coded instruction word would relate to the selection of the first column of the areas 11 containing the symbols 0, 4, 8 etc. and the digits 0, 1 in the same positions of the instruction word would relate to selection of the second column and so on.

A similar selection system could be employed for selection in the vertical direction. Four pulse waveworms each comprising one pulse per raster embracing the interval of scanning of eight lines could be derived by conventional counting circuit technique from an oscillation at the line frequency and the appropriate one of these pulse waveforms could be selected under the control of a pair of digits in the staticised instruction word or signal. These selected pulses would control a gate circuit in the signal channel in the same way as the pulses employed for column selection. The selected pulses defining the column and the line group may obviously be defined and selected together by digit combinations which represent in coded forms the symbols which are required. Thus in the example shown the numerical symbols in the decimal scale could correspond directly with their binary code equivalents. Thus the programming of a digital computing machine with which the present invention might be required to operate could be so arranged that when the results are to be displayed or printed each decimal digit or the binary code equivalent of a symbol could appear in binary form upon an output static register and the output voltages from the latter utilised to control the selecting circuits as oulined above. Thus, for example, if the numeral 7 is to be displayed, the associated computing machine would, at the appropriate time, cause an output staticisor to be set up with the binary number 1110, i. e., the binary equivalent of the decimal numeral 7 (using the left to right reading sequence). The least significant digits 1 and 1 would cause a pulse to be fed to the gate circuit in the signal channel which would condition the gate to open during the last quarter of each line scan period while the most significant digits 1 and 0 would cause the additional selecting pulse to be fed to the gate which permits such gate to open only during the time period embracing the second group of eight lines in the raster. In consequence the gating means would provide for transmission only during the selected last quarter of each of the eight lines in the second group of the raster lines.

Various modifications and elaborations may be made without departing from the scope of the invention. For example, means may be provided for photographing the display on tube 26. Exposure timing may be controlled by switching the anode potential of the tube. One or more further tubes may be connected in parallel with the tube 26 while the numbers of symbol areas scanned and displayed in each row and the number of columns of symbols provided on the tubes 26 and 31 may be different from those on the tube 10 provided appropriate modification of the time-base and shift potentials is made.

I claim:

1. Data recording means comprising a first cathode ray tube having a screen bearing a number of areas in the form of symbols suitable for expressing the data which is to be recorded and which have a secondary electron emission ratio different from that of the rest of said screen, an electrostatic signal pick-up plate associated with said screen, means causing the electron beam of said tube to scan part of said screen bearing one of said areas in a plurality of different random selected orders, the part scanned being chosen in accordance with the signal representing the data to be recorded, such means comprising means for scanning the whole of said larger screen portion by a raster-like movement of the cathode ray tube beam and means for rendering said scanning beam ineffective except at those time instants when it is passing over the part of said screen bearing one of said areas, a second cathode ray tube, means for scanning part of the screen in said second tube in synchronism with the scanning in said first tube, the parts of the screen which are successively scanned in said second tube being arranged in an orderly sequence, means for modulating the electron beam in said second tube in accordance with the signals received from said electrostatic signal pick-up plate of said first tube so that the symbol scanned in said first tube and selected in accordance with the data signals is reproduced in an orderly arrangement on the screen of said second tube, a third cathode ray tube arranged as an electrostatic storage device, circuit means for operating said third cathode ray tube in parallel with said second cathode ray tube and means for deriving beam controlling potentials for said second cathode ray tube from said third cathode ray tube to provide a persistent display on said second tube of the recorded data.

2. Data recording means comprising a first cathode ray tube having a screen bearing a number of areas in the form of symbols suitable for expressing the data which is to be recorded and which have, under the operating conditions of the tube, a secondary electron emission ratio which is less than unity whereas the rest of said screen has, under the same conditions, a secondary electron emission ratio which is greater than unity, an electrostatic signal pick-up plate associated with said screen, means causing the electron beam of said tube to scan part of said screen bearing one of said areas in a plurality of different random selected orders, the part scanned being chosen in accordance with the signal representing the data to be recorded, such means comprising means for scanning the whole of said larger screen portion by a raster-like movement of the cathode ray tube beam and means for rendering said scanning beam ineffective except at those time instants when it is passing over the part of said screen bearing one of said areas, a second cathode ray tube, means for scanning part of the screen in said second tube in synchronism with the scanning in said first tube, the parts of the screen which are successively scanned in said second tube being arranged in an orderly sequence, means for modulating the electron beam in said second tube in accordance with the signals received from said electrostatic signal pick-up plate of said first tube so that the symbol scanned in said first tube and selected in accordance with the data signals is reproduced in an orderly arrangement on the screen of said second tube, a third cathode ray tube arranged as an electrostatic storage device, circuit means for operating said third cathode ray tube in parallel with said second cathode ray tube and means for deriving beam controlling potentials for said second cathode ray tube from said third cathode ray tube to provide a persistent display on said second tube of the recorded data.

3. Data recording means comprising a first cathode ray tube having a screen bearing a number of areas in the form of symbols suitable for expressing the data which is to be recorded and which have a secondary electron emission ratio different from that of the rest of said screen, each of said symbol defining areas being arranged within a separate small rectangular portion of said screen and said small screen portions being disposed as a mosaic of rows and columns within a larger rectangular screen portion, an electrostatic signal pick-up plate associated with said screen, means causing the electron beam of said tube to scan one of said small portions of said screen bearing one of said areas in a plurality of different random selected orders, the portion scanned being chosen in accordance with the signal representing the data to be recorded, such means comprising means for scanning the whole of said larger screen portion by a raster-like movement of the cathode ray tube beam and means for rendering said scanning beam ineffective except at those time instants when it is passing over said small screen portion, a second cathode ray tube, means for scanning part of the screen in said second tube in synchronism with the scanning in said first tube, the parts of the screen which are successively scanned in said second tube being arranged in an orderly sequence, means for modulating the electron beam in said second tube in accordance with the signals received from said electrostatic signal pick-up plate of said first tube so that the symbol scanned in said first tube and selected in accordance with the data signals is reproduced in an orderly arrangement on the screen of said second tube, a third cathode ray tube arranged as an electrostatic storage device, circuit means for operating said third cathode ray tube in parallel with said second cathode ray tube and means for deriving beam controlling potentials for said second cathode ray tube from said third cathode ray tube to provide a persistent display on said second tube of the recorded data.

References Cited in the file of this patent

UNITED STATES PATENTS

| | | |
|---|---|---|
| 2,093,157 | Nakashima et al. | Sept. 14, 1937 |
| 2,267,827 | Hubbard | Dec. 30, 1941 |
| 2,283,383 | McNaney | May 19, 1942 |
| 2,379,880 | Burgess | July 10, 1945 |
| 2,402,989 | Dickinson | July 2, 1946 |
| 2,538,065 | Wallace | Jan. 16, 1951 |
| 2,755,994 | Williams | July 24, 1956 |
| 2,755,996 | Williams | July 24, 1956 |
| 2,784,251 | Young | Mar. 5, 1957 |